United States Patent
Smyth et al.

(10) Patent No.: US 9,669,774 B2
(45) Date of Patent: Jun. 6, 2017

(54) RECONFIGURABLE VEHICLE INTERIOR ASSEMBLY

(71) Applicant: GM GLOBAL TECHNOLOGY OPERATIONS LLC, Detroit, MI (US)

(72) Inventors: Susan M. Smyth, Rochester Hills, MI (US); Mark Allen Smith, Huntington Woods, MI (US); Robert Bruce Tilove, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/510,630

(22) Filed: Oct. 9, 2014

(65) Prior Publication Data

US 2015/0102621 A1 Apr. 16, 2015

Related U.S. Application Data (60) Provisional application No. 61/889,590, filed on Oct. 11, 2013.

(51) Int. Cl.
*B60R 13/00* (2006.01)
*B60R 13/02* (2006.01)

(52) U.S. Cl.
CPC .......... *B60R 13/0206* (2013.01); *B60R 13/02* (2013.01); *B60R 2013/0293* (2013.01)

(58) Field of Classification Search
CPC .................... B60R 13/0206; B60R 2013/0293
USPC ..................................... 296/70, 1.08; 24/297
See application file for complete search history.

(56) References Cited

U.S. PATENT DOCUMENTS

| | | |
|---|---|---|
| 1,219,398 A | 3/1917 | Huntsman |
| 1,261,036 A | 4/1918 | Kerns |
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |

(Continued)

FOREIGN PATENT DOCUMENTS

| | | |
|---|---|---|
| BE | 842302 A | 9/1976 |
| CN | 1032581 A | 4/1989 |

(Continued)

OTHER PUBLICATIONS

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

(Continued)

*Primary Examiner* — Dennis H Pedder
(74) *Attorney, Agent, or Firm* — Cantor Colburn LLP (57) ABSTRACT

In one embodiment, a reconfigurable vehicle interior assembly is provided. The assembly includes a trim member including a plurality of first elastically deformable mating members and a vehicle interior carrier component including a plurality of second elastically deformable mating members. Each of the first elastically deformable mating members matingly engages with at least one of the second elastically deformable mating members in order to couple the trim member to the vehicle interior carrier component. The first and second elastically deformable mating members collectively form a plurality of elastic averaging couplings.

15 Claims, 3 Drawing Sheets

(56) References Cited

U.S. PATENT DOCUMENTS

| | | |
|---|---|---|
| 1,982,076 A | 11/1934 | Spahn |
| 1,999,990 A | 4/1935 | Carr |
| 2,006,525 A | 7/1935 | Thal |
| 2,058,319 A | 10/1936 | Jones |
| 2,164,634 A | 7/1939 | Barrett |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,788,046 A | 4/1957 | Joseph |
| 2,862,040 A | 11/1958 | Curran |
| 2,902,902 A | 9/1959 | Slone |
| 2,940,149 A | 6/1960 | O'Connor |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,050,160 A | 8/1962 | Chesser |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,580,628 A | 5/1971 | Rantala |
| 3,643,968 A | 2/1972 | Horvath |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,838,928 A | 10/1974 | Blaurock et al. |
| 3,841,044 A | 10/1974 | Brown |
| 3,841,682 A | 10/1974 | Church |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyl |
| 3,905,570 A | 9/1975 | Nieuwveld |
| 3,967,351 A | 7/1976 | Rosenberg et al. |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,212,415 A | 7/1980 | Neely |
| 4,213,675 A | 7/1980 | Pilhall |
| 4,237,573 A | 12/1980 | Weihrauch |
| 4,267,680 A | 5/1981 | Delattre |
| 4,286,894 A | 9/1981 | Rongley |
| 4,300,851 A | 11/1981 | Thelander |
| 4,313,609 A | 2/1982 | Clements |
| 4,314,417 A | 2/1982 | Cain |
| 4,318,208 A | 3/1982 | Borja |
| 4,325,574 A | 4/1982 | Umemoto et al. |
| 4,358,166 A | 11/1982 | Antoine |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,407,413 A | 10/1983 | Jansson |
| 4,477,142 A | 10/1984 | Cooper |
| 4,479,737 A | 10/1984 | Bergh et al. |
| 4,481,160 A | 11/1984 | Bree |
| 4,527,760 A | 7/1985 | Salacuse |
| 4,564,232 A | 1/1986 | Fujimori et al. |
| 4,575,060 A | 3/1986 | Kitagawa |
| 4,591,203 A | 5/1986 | Furman |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,672,732 A | 6/1987 | Ramspacher |
| 4,715,095 A | 12/1987 | Takahashi |
| 4,745,656 A | 5/1988 | Revlett |
| 4,746,008 A | 5/1988 | Heverly et al. |
| 4,757,655 A | 7/1988 | Jentoft et al. |
| 4,767,647 A | 8/1988 | Bree |
| 4,778,282 A | 10/1988 | Borchardt et al. |
| 4,805,272 A | 2/1989 | Yamaguchi |
| 4,807,335 A | 2/1989 | Candea |
| 4,817,999 A | 4/1989 | Drew |
| 4,819,309 A | 4/1989 | Behymer |
| 4,819,983 A | 4/1989 | Alexander et al. |
| 4,828,423 A | 5/1989 | Cramer, Jr. et al. |
| 4,843,975 A | 7/1989 | Welsch |
| 4,843,976 A | 7/1989 | Pigott et al. |
| 4,865,502 A | 9/1989 | Maresch |
| 4,881,764 A | 11/1989 | Takahashi et al. |
| 4,907,582 A | 3/1990 | Meyerrose |
| 4,909,929 A | 3/1990 | Tabor |
| 4,917,426 A | 4/1990 | Copp |
| 4,973,212 A | 11/1990 | Jacobs |
| 4,977,648 A | 12/1990 | Eckerud |
| 5,005,265 A | 4/1991 | Muller |
| 5,007,759 A | 4/1991 | Scherer |
| 5,039,267 A | 8/1991 | Wollar |
| 5,094,580 A | 3/1992 | Abe |
| 5,100,015 A | 3/1992 | Vanderstuyf |
| 5,111,557 A | 5/1992 | Baum et al. |
| 5,139,285 A | 8/1992 | Lasinski |
| 5,154,479 A | 10/1992 | Sautter, Jr. |
| 5,165,749 A | 11/1992 | Sheppard |
| 5,170,985 A | 12/1992 | Killworth et al. |
| 5,178,433 A | 1/1993 | Wagner |
| 5,180,219 A | 1/1993 | Geddie |
| 5,186,517 A | 2/1993 | Gilmore et al. |
| 5,208,507 A | 5/1993 | Jung |
| 5,212,853 A * | 5/1993 | Kaneko .......................... 24/452 |
| 5,234,122 A | 8/1993 | Cherng |
| 5,250,001 A | 10/1993 | Hansen |
| 5,297,322 A | 3/1994 | Kraus |
| 5,309,663 A | 5/1994 | Shirley |
| 5,333,965 A | 8/1994 | Mailey |
| 5,339,491 A | 8/1994 | Sims |
| 5,342,139 A | 8/1994 | Hoffman |
| 5,348,356 A | 9/1994 | Moulton |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |

(56) References Cited

U.S. PATENT DOCUMENTS

| | | |
|---|---|---|
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |
| 5,577,301 A | 11/1996 | DeMaagd |
| 5,577,779 A * | 11/1996 | Dangel ............................ 292/80 |
| 5,580,204 A | 12/1996 | Hultman |
| 5,586,372 A * | 12/1996 | Eguchi et al. .................... 24/452 |
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,639,140 A | 6/1997 | Labrash |
| 5,657,516 A * | 8/1997 | Berg et al. ....................... 24/452 |
| 5,657,893 A | 8/1997 | Hitchings |
| 5,666,749 A | 9/1997 | Waters |
| 5,667,271 A | 9/1997 | Booth |
| 5,670,013 A | 9/1997 | Huang et al. |
| 5,671,513 A | 9/1997 | Kawahara |
| 5,671,696 A | 9/1997 | Liethen |
| 5,698,276 A | 12/1997 | Mirabitur |
| 5,702,779 A | 12/1997 | Siebelink, Jr. et al. |
| 5,704,753 A | 1/1998 | Ueno |
| 5,706,559 A | 1/1998 | Oliver |
| 5,736,221 A | 4/1998 | Hardigg et al. |
| 5,765,942 A | 6/1998 | Shirai et al. |
| 5,770,320 A | 6/1998 | Hughes et al. |
| 5,775,860 A | 7/1998 | Meyer |
| 5,795,118 A | 8/1998 | Osada et al. |
| 5,797,170 A * | 8/1998 | Akeno ............................. 24/452 |
| 5,797,714 A | 8/1998 | Oddenino |
| 5,799,930 A | 9/1998 | Willett |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,865,500 A | 2/1999 | Sanada et al. |
| 5,915,678 A | 6/1999 | Slocum et al. |
| 5,920,200 A | 7/1999 | Pendse |
| 5,929,382 A | 7/1999 | Moore |
| 5,931,514 A | 8/1999 | Chung |
| 5,934,729 A | 8/1999 | Baack |
| 5,941,673 A | 8/1999 | Hayakawa et al. |
| 5,988,678 A | 11/1999 | Nakamura |
| 6,006,941 A | 12/1999 | Hitchings |
| 6,010,306 A | 1/2000 | Bucher |
| 6,036,198 A | 3/2000 | Kramer |
| 6,062,763 A | 5/2000 | Sirois et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,142,509 A | 11/2000 | White, Jr. et al. |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,213,677 B1 | 4/2001 | Yamane et al. |
| 6,237,344 B1 | 5/2001 | Lee |
| 6,254,304 B1 | 7/2001 | Takizawa et al. |
| 6,264,869 B1 | 7/2001 | Notarpietro et al. |
| 6,283,540 B1 | 9/2001 | Siebelink, Jr. et al. |
| 6,286,214 B1 | 9/2001 | Bean |
| 6,289,560 B1 | 9/2001 | Guyot |
| 6,299,478 B1 | 10/2001 | Jones et al. |
| 6,311,960 B1 | 11/2001 | Pierman et al. |
| 6,318,585 B1 | 11/2001 | Asagiri |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,574 B1 | 3/2002 | Oliver et al. |
| 6,354,815 B1 | 3/2002 | Svihla et al. |
| 6,378,931 B1 | 4/2002 | Kolluri et al. |
| 6,398,449 B1 | 6/2002 | Loh |
| 6,470,540 B2 | 10/2002 | Aamodt et al. |
| 6,478,102 B1 | 11/2002 | Puterbaugh |
| 6,484,370 B2 | 11/2002 | Kanie et al. |
| 6,485,241 B1 | 11/2002 | Oxford |
| 6,498,297 B2 | 12/2002 | Samhammer |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,594,861 B2 | 7/2003 | Dimig et al. |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,668,424 B1 | 12/2003 | Allen |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,840,969 B2 | 1/2005 | Kobayashi et al. |
| 6,846,125 B2 | 1/2005 | Smith et al. |
| 6,857,676 B2 | 2/2005 | Kawaguchi et al. |
| 6,857,809 B2 | 2/2005 | Granata |
| 6,872,053 B2 | 3/2005 | Bucher |
| 6,895,651 B2 | 5/2005 | Li |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2 | 10/2005 | Wilson |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,165,310 B2 | 1/2007 | Murakami et al. |
| 7,172,210 B2 | 2/2007 | Yokota |
| 7,178,855 B2 | 2/2007 | Catron et al. |
| 7,198,315 B2 | 4/2007 | Cass et al. |
| 7,207,758 B2 | 4/2007 | Leon et al. |
| 7,234,852 B2 | 6/2007 | Nishizawa et al. |
| 7,275,296 B2 | 10/2007 | DiCesare |
| 7,275,772 B2 | 10/2007 | Lee |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |

(56) References Cited

U.S. PATENT DOCUMENTS

| | | |
|---|---|---|
| 7,493,716 B2 | 2/2009 | Brown |
| 7,500,440 B2 | 3/2009 | Chiu |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,610,671 B2 | 11/2009 | Watkins et al. |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi et al. |
| 7,793,998 B2 | 9/2010 | Matsui et al. |
| 7,802,831 B2 | 9/2010 | Isayama et al. |
| 7,803,015 B2 | 9/2010 | Pham |
| 7,828,372 B2 | 11/2010 | Ellison |
| 7,832,693 B2 | 11/2010 | Moerke et al. |
| 7,862,272 B2 | 1/2011 | Nakajima |
| 7,869,003 B2 | 1/2011 | Van Doren et al. |
| 7,883,137 B2 | 2/2011 | Bar |
| 7,891,926 B2 | 2/2011 | Jackson, Jr. |
| 7,922,415 B2 | 4/2011 | Rudduck et al. |
| 7,946,684 B2 | 5/2011 | Drury et al. |
| 7,959,214 B2 | 6/2011 | Salhoff |
| 7,971,913 B2 | 7/2011 | Sunahara et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,187,369 B2 | 5/2012 | Rogers |
| 8,203,496 B2 | 6/2012 | Miller et al. |
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 * | 10/2012 | Dole .................. B62D 1/16 24/614 |
| 8,297,661 B2 | 10/2012 | Proulx et al. |
| 8,312,887 B2 | 11/2012 | Dunn et al. |
| 8,328,250 B2 | 12/2012 | Botten et al. |
| 8,371,788 B2 | 2/2013 | Lange |
| 8,371,789 B2 | 2/2013 | Takita |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,520,404 B2 | 8/2013 | Hamaguchi |
| 8,572,818 B2 | 11/2013 | Hofmann |
| 8,579,141 B2 | 11/2013 | Tejima |
| 8,607,952 B2 | 12/2013 | Keating et al. |
| 8,619,504 B2 | 12/2013 | Wyssbrod |
| 8,648,264 B2 | 2/2014 | Masumoto |
| 8,656,563 B2 | 2/2014 | Hiramatsu |
| 8,677,573 B2 | 3/2014 | Lee |
| 8,695,201 B2 * | 4/2014 | Morris .................. B25B 27/00 24/453 |
| 8,720,016 B2 | 5/2014 | Beaulieu |
| 8,726,473 B2 | 5/2014 | Dole |
| 8,746,801 B2 | 6/2014 | Nakata |
| 8,756,787 B2 | 6/2014 | Zimmermann et al. |
| 8,773,846 B2 | 7/2014 | Wang |
| 8,811,004 B2 | 8/2014 | Liu |
| 8,826,499 B2 * | 9/2014 | Tempesta .................. 24/406 |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,038,335 B1 | 5/2015 | Eck |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 9,302,569 B2 | 4/2016 | Ogino et al. |
| 9,303,667 B2 | 4/2016 | Morris et al. |
| 2001/0016986 A1 | 8/2001 | Bean |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0130239 A1 | 9/2002 | Ishigami et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0107202 A1 | 6/2003 | Tajima et al. |
| 2003/0108401 A1 | 6/2003 | Agha et al. |
| 2003/0180122 A1 | 9/2003 | Dobson |
| 2004/0016088 A1 | 1/2004 | Angellotti |
| 2004/0028503 A1 | 2/2004 | Charles |
| 2004/0037637 A1 | 2/2004 | Lian et al. |
| 2004/0051221 A1 | 3/2004 | Sunadome |
| 2004/0052574 A1 | 3/2004 | Grubb |
| 2004/0083583 A1 | 5/2004 | Bradley |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0191123 A1 | 9/2005 | Wertz |
| 2005/0208375 A1 | 9/2005 | Sakurai |
| 2005/0217088 A1 | 10/2005 | Lin |
| 2005/0244250 A1 | 11/2005 | Okada et al. |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yi et al. |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0258756 A1 | 11/2007 | Olshausen |

(56) References Cited

U.S. PATENT DOCUMENTS

| | | |
|---|---|---|
| 2007/0274777 A1 | 11/2007 | Winkler |
| 2007/0292205 A1 | 12/2007 | Duval |
| 2008/0011930 A1 | 1/2008 | Nagai |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0196535 A1 | 8/2008 | Dole |
| 2008/0217796 A1 | 9/2008 | Van Bruggen et al. |
| 2008/0260454 A1 | 10/2008 | Girodo et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0117319 A1 | 5/2009 | Hubert |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh |
| 2009/0154303 A1 | 6/2009 | Vaucher et al. |
| 2009/0174207 A1 | 7/2009 | Lota |
| 2009/0211804 A1 | 8/2009 | Zhou et al. |
| 2009/0243172 A1 | 10/2009 | Ting et al. |
| 2009/0265896 A1 | 10/2009 | Beak |
| 2009/0309388 A1 | 12/2009 | Ellison |
| 2009/0318069 A1* | 12/2009 | Konet ............... B60H 1/3428 454/155 |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0191993 A1 | 8/2011 | Forrest |
| 2011/0194895 A1 | 8/2011 | Lai |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan et al. |
| 2012/0073094 A1 | 3/2012 | Bishop |
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0251226 A1* | 10/2012 | Liu et al. ................ 403/280 |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0157578 A1 | 6/2014 | Morris et al. |
| 2014/0159412 A1 | 6/2014 | Morris et al. |
| 2014/0172112 A1 | 6/2014 | Marter |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0260041 A1 | 9/2014 | Peck |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0043959 A1 | 2/2015 | Morris |
| 2015/0050068 A1 | 2/2015 | Morris et al. |
| 2015/0052725 A1 | 2/2015 | Morris et al. |
| 2015/0056009 A1 | 2/2015 | Morris |
| 2015/0063943 A1 | 3/2015 | Morris |
| 2015/0069779 A1 | 3/2015 | Morris et al. |
| 2015/0078805 A1 | 3/2015 | Morris et al. |
| 2015/0086265 A1 | 3/2015 | Morris |
| 2015/0093177 A1 | 4/2015 | Morris |
| 2015/0093178 A1 | 4/2015 | Morris |
| 2015/0093179 A1 | 4/2015 | Morris et al. |
| 2015/0098748 A1 | 4/2015 | Morris et al. |
| 2015/0115656 A1 | 4/2015 | Lungershausen |
| 2015/0135509 A1 | 5/2015 | Morris et al. |
| 2015/0164184 A1 | 6/2015 | Morris et al. |
| 2015/0165609 A1 | 6/2015 | Morris et al. |
| 2015/0165985 A1 | 6/2015 | Morris |
| 2015/0165986 A1 | 6/2015 | Morris |
| 2015/0166124 A1 | 6/2015 | Morris |
| 2015/0167717 A1 | 6/2015 | Morris |
| 2015/0167718 A1 | 6/2015 | Morris et al. |
| 2015/0174740 A1 | 6/2015 | Morris et al. |
| 2015/0175091 A1 | 6/2015 | Morris et al. |
| 2015/0175217 A1 | 6/2015 | Morris et al. |
| 2015/0175219 A1 | 6/2015 | Kiester |
| 2015/0176759 A1 | 6/2015 | Morris et al. |
| 2015/0192160 A1 | 7/2015 | Gong |
| 2015/0194650 A1 | 7/2015 | Morris et al. |
| 2015/0197970 A1 | 7/2015 | Morris et al. |
| 2015/0232130 A1 | 8/2015 | Colombo |
| 2015/0232131 A1 | 8/2015 | Morris et al. |
| 2015/0274217 A1 | 10/2015 | Colombo |
| 2015/0291222 A1 | 10/2015 | Colombo et al. |
| 2015/0308534 A1 | 10/2015 | Smith et al. |

(56) References Cited

U.S. PATENT DOCUMENTS

| | | | |
|---|---|---|---|
| 2015/0308538 A1 | 10/2015 | Morris et al. | |
| 2015/0353028 A1 | 12/2015 | Courtin et al. | |
| 2015/0375798 A1 | 12/2015 | Morris et al. | |
| 2016/0200268 A1 | 7/2016 | Morris et al. | |

FOREIGN PATENT DOCUMENTS

| | | | |
|---|---|---|---|
| CN | 1036250 A | 10/1989 | |
| CN | 1062629 A | 7/1992 | |
| CN | 1129162 A | 8/1996 | |
| CN | 2285844 Y | 7/1998 | |
| CN | 1205285 A | 1/1999 | |
| CN | 1204744 A | 7/1999 | |
| CN | 1328521 A | 12/2001 | |
| CN | 1426872 A | 7/2003 | |
| CN | 1496451 A | 5/2004 | |
| CN | 2661972 Y | 12/2004 | |
| CN | 2679409 Y | 2/2005 | |
| CN | 1670986 A | 9/2005 | |
| CN | 100573975 C | 9/2005 | |
| CN | 1693721 A | 11/2005 | |
| CN | 1771399 A | 5/2006 | |
| CN | 1774580 A | 5/2006 | |
| CN | 2872795 Y | 2/2007 | |
| CN | 2874103 Y | 2/2007 | |
| CN | 1933747 A | 3/2007 | |
| CN | 2888807 Y | 4/2007 | |
| CN | 1961157 A | 5/2007 | |
| CN | 2915389 Y | 7/2007 | |
| CN | 101002030 A | 7/2007 | |
| CN | 101005741 A | 7/2007 | |
| CN | 200941716 Y | 8/2007 | |
| CN | 200957794 Y | 10/2007 | |
| CN | 101250964 A | 8/2008 | |
| CN | 101390022 A | 3/2009 | |
| CN | 201259846 Y | 6/2009 | |
| CN | 201268336 Y | 7/2009 | |
| CN | 201310827 Y | 9/2009 | |
| CN | 101701595 A | 5/2010 | |
| CN | 201540513 U | 8/2010 | |
| CN | 101821534 A | 9/2010 | |
| CN | 101930253 A | 12/2010 | |
| CN | 201703439 U | 1/2011 | |
| CN | 201737062 U | 2/2011 | |
| CN | 201792722 U | 4/2011 | |
| CN | 201818606 U | 5/2011 | |
| CN | 201890285 U | 7/2011 | |
| CN | 102144102 A | 8/2011 | |
| CN | 102235402 A | 11/2011 | |
| CN | 202024057 U | 11/2011 | |
| CN | 202079532 U | 12/2011 | |
| CN | 102313952 A | 1/2012 | |
| CN | 202132326 U | 2/2012 | |
| CN | 102463882 A | 5/2012 | |
| CN | 102540855 A | 7/2012 | |
| CN | 102756633 A | 10/2012 | |
| CN | 102803753 A | 11/2012 | |
| CN | 202561269 U | 11/2012 | |
| CN | 102817892 A | 12/2012 | |
| CN | 102869891 A | 1/2013 | |
| CN | 102904128 A | 1/2013 | |
| CN | 202686206 U | 1/2013 | |
| CN | 102918315 A | 2/2013 | |
| CN | 102939022 A | 2/2013 | |
| CN | 202764872 U | 3/2013 | |
| CN | 202987018 U | 6/2013 | |
| CN | 103201525 A | 7/2013 | |
| CN | 103206595 A | 7/2013 | |
| CN | 103206596 A | 7/2013 | |
| CN | 203189459 U | 9/2013 | |
| CN | 203344856 U | 12/2013 | |
| CN | 103591102 A | 2/2014 | |
| CN | 104100609 A | 10/2014 | |
| CN | 203991175 U | 12/2014 | |
| DE | 1220673 B | 7/1966 | |
| DE | 2527023 A1 | 12/1976 | |
| DE | 2736012 A1 | 2/1978 | |
| DE | 2703897 A1 | 8/1978 | |
| DE | 2809746 A1 | 9/1979 | |
| DE | 3008990 A1 | 9/1980 | |
| DE | 3704190 A1 | 12/1987 | |
| DE | 3711696 A1 | 10/1988 | |
| DE | 3805693 A1 | 2/1989 | |
| DE | 3815927 | 11/1989 | |
| DE | 9109276 U1 | 7/1991 | |
| DE | 4002443 A1 | 8/1991 | |
| DE | 4111245 A1 | 10/1991 | |
| DE | 9201258 U1 | 3/1992 | |
| DE | 29714892 U1 | 10/1997 | |
| DE | 29800379 U1 | 5/1998 | |
| DE | 69600357 T2 | 12/1998 | |
| DE | 10003852 A1 | 8/2001 | |
| DE | 10234253 B3 | 4/2004 | |
| DE | 10333540 A1 | 2/2005 | |
| DE | 60105817 T2 | 2/2006 | |
| DE | 202007006175 U1 | 8/2007 | |
| DE | 102008005618 A1 | 7/2009 | |
| DE | 102008063920 A1 | 9/2009 | |
| DE | 102008047464 A1 | 4/2010 | |
| DE | 10202644 C1 | 11/2011 | |
| DE | 102010028323 A1 | 11/2011 | |
| DE | 102010026218 A1 | 1/2012 | |
| DE | 102011050003 A1 | 10/2012 | |
| DE | 102012212101 A1 | 7/2013 | |
| DE | 102013003028 A1 | 3/2014 | |
| EP | 0118796 A2 | 9/1984 | |
| EP | 0616140 A2 | 9/1994 | |
| EP | 1132263 A1 | 9/2001 | |
| EP | 1243471 A2 | 9/2002 | |
| EP | 12737766 A1 | 1/2003 | |
| EP | 1293384 A2 | 3/2003 | |
| EP | 1384536 A2 | 1/2004 | |
| EP | 1388449 A1 | 2/2004 | |
| EP | 1452745 A1 | 9/2004 | |
| EP | 1550818 A1 | 7/2005 | |
| EP | 2166235 A2 | 3/2010 | |
| EP | 2450259 A1 | 5/2012 | |
| EP | 2458454 A1 | 5/2012 | |
| FR | 1369198 A | 8/1964 | |
| FR | 2009941 A1 | 2/1970 | |
| FR | 2750177 A2 | 12/1997 | |
| FR | 2942749 A1 | 9/2010 | |
| FR | 2958696 A1 | 10/2011 | |
| GB | 155838 | 3/1922 | |
| GB | 994891 | 6/1965 | |
| GB | 2175626 A | 12/1986 | |
| GB | 2281950 A | 3/1995 | |
| GB | 2348924 A | 10/2000 | |
| GB | 2496613 A | 6/2013 | |
| JP | S6054264 A | 3/1985 | |
| JP | H0861318 A | 3/1996 | |
| JP | H08200420 A | 8/1996 | |
| JP | H0942233 A | 2/1997 | |
| JP | 2000-192924 | * 12/1998 | |
| JP | 2000010514 A | 1/2000 | |
| JP | 2000287717 A | 10/2000 | |
| JP | 2001141154 A | 5/2001 | |
| JP | 2001171554 A | 6/2001 | |
| JP | 2003158387 A | 5/2003 | |
| JP | 2003314515 A | 11/2003 | |
| JP | 2005268004 | 9/2005 | |
| JP | 2006205918 | 8/2006 | |
| JP | 2008307938 A | 12/2008 | |
| JP | 2009084844 | 4/2009 | |
| JP | 2009187789 A | 8/2009 | |
| JP | 2010266519 A | 11/2010 | |
| JP | 2011085174 A | 4/2011 | |
| JP | 2012060791 A | 3/2012 | |
| JP | 2012112533 A | 6/2012 | |
| JP | 2012126421 A | 7/2012 | |
| KR | 20030000251 A1 | 1/2003 | |
| KR | 100931019 B1 | 12/2009 | |
| WO | 9602963 A1 | 2/1996 | |
| WO | 9822739 A1 | 5/1998 | |

(56) References Cited

FOREIGN PATENT DOCUMENTS

| WO | 0055517 A2 | 3/2000 |
|---|---|---|
| WO | 0132454 A3 | 11/2001 |
| WO | 2004010011 | 1/2004 |
| WO | 2007126201 A1 | 11/2007 |
| WO | 2008140659 A1 | 11/2008 |
| WO | 2010105354 A1 | 9/2010 |
| WO | 2011025606 | 3/2011 |
| WO | 2011089650 A1 | 7/2011 |
| WO | 2013088447 A1 | 6/2013 |
| WO | 2013191622 A1 | 12/2013 |
| WO | 2014119366 A1 | 8/2014 |

OTHER PUBLICATIONS

Rojas, F.E., et al., "Kinematic Coupling for Precision Fixturing & Assembly" MIT Precision Engineering Research Group, Apr. 2013; 24 pgs.

Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013; 4 pgs.

Willoughby, P., "Elastically Averaged Precision Alignment", Degree of Doctor of Philosophy in Mechanical Engineering Dissertation, Massachusetts Institute of Technology, 2005; 158 pgs.

"Passive Alignment of Micro-Fluidic Chips Using the Principle of Elastic Averaging" by Sitanshu Gurung, Thesis, Louisiana State University, Dept. of Mechnical engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

"The Design of High Precision Parallel Mechanisms Using Binary Actuation and Elastic Averaging: With Application to MRI Cancer Treatment" by L.M. Devita, J.S. Plante, and S. Dubowsky, 12th IFToMM World Congress (France), Jun. 2007.

Awtar, S., et al., "Elastic Averaging in Flexure Mechanisms: A Multi-Beam Paralleaogram Flexture Case-Study", Proceedings of IDETC/CIE 2006, Paper DETC2006-99752, American Society of Mechanical Engineers (ASME), Sep. 2006; 7 pgs.

Balasubramaniam, M., et al.,"An Anti Backlash Two-Part Shaft Coupling With Interlocking Elastically Averaged Teeth" Precision Engineering, V. 26, No. 3, Elsevier Publishing, Jul. 2002; 28 pages.

Cross-sectional view of a prior art infrared welded assembly of BMW, Munich, Germany. Believed on the market since about Jan. 1, 2010, 1 page.

DeVita, L., Plante, J. & Dubowsky, S. (Jun. 2007). The Design of High Precision Parallel Mechanisms using Binary Actuation and Elastic Averaging: With Application to MRI Cancer Treatment., 12th IFToMM World Congress, Besancon (France).

Gurung, S. (Dec. 2007). Passive Alignment of Micro-Fluidic Chips Using the Principle of Elastic Averaging. Thesis: Louisiana State University, Dept. Of Mechanical Engineering; 74 pgs.

Willoughby, P. & Slocum, A. (2004). Precision Connector Assembly using Elastic Averaging. Massachusetts Institute of Technology (MIT), Cambridge, MA, American Society for Precision Engineering. 3 pgs.

* cited by examiner

RECONFIGURABLE VEHICLE INTERIOR ASSEMBLY

CROSS REFERENCE TO RELATED APPLICATION

This application claims the benefit of Provisional Application Ser. No. 61/889,590, filed Oct. 11, 2013, the contents of which are incorporated herein by reference thereto.

TECHNICAL FIELD

The present disclosure relates to a reconfigurable vehicle interior assembly.

BACKGROUND

Most vehicles, such as automobiles, include a vehicle interior assembly that defines a passenger compartment. Vehicle occupants spend most of their time in the passenger compartment. It is therefore useful to tailor the aesthetic appearance of the vehicle interior assembly in accordance with the vehicle occupant's preferences.

SUMMARY

In one embodiment, a reconfigurable vehicle interior assembly is provided. The assembly includes a trim member including a plurality of first elastically deformable mating members and a vehicle interior carrier component including a plurality of second elastically deformable mating members. Each of the first elastically deformable mating members matingly engages with at least one of the second elastically deformable mating members in order to couple the trim member to the vehicle interior carrier component. The first and second elastically deformable mating members collectively form a plurality of elastic averaging couplings.

In another embodiment, a vehicle is provided. The vehicle includes a trim assembly including a plurality of a trim members, each of the trim members including a plurality of first elastically deformable mating members, and a vehicle interior carrier component sub-assembly including a plurality of a vehicle interior carrier components. Each of the vehicle interior carrier components includes a plurality of second elastically deformable mating members, and each of the first elastically deformable mating members engages at least one of the second elastically deformable mating members in order to couple the trim members to the vehicle interior carrier components. The first and second elastically deformable mating members collectively form a plurality of elastic averaging couplings.

In yet another embodiment, a method of assembling a vehicle interior assembly is provided. The method includes providing a trim member including a plurality of first elastically deformable mating members, and providing a vehicle interior carrier component including a plurality of second elastically deformable mating members. Each of the first elastically deformable mating members is configured to deformably engage at least one of the second elastically deformable mating members. The method further includes mating the first elastically deformable mating members with the second deformable mating members in order to couple the trim member to the vehicle interior coupling member.

The above features and advantages and other features and advantages of the invention are readily apparent from the following detailed description for carrying out the invention when taken in connection with the accompanying drawings.

DETAILED DESCRIPTION

The following description is merely exemplary in nature and is not intended to limit the present disclosure, its application or uses. For example, the embodiments shown are applicable to vehicle components, but the system disclosed herein may be used with any suitable components to provide securement and elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior, electrical and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. In some embodiments, the elastically deformable component configured to have the at least one feature and associated mating feature disclosed herein may require more than one of such features, depending on the requirements of a particular embodiment. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned U.S. Pat. No. 8,695,201, the disclosure of which is incorporated by reference herein in its entirety. The embodiments disclosed above provide the ability to convert an existing component that is not compatible with the above-described elastic averaging principles, or that would be further aided with the inclusion of an elastic averaging system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

Figure 1:
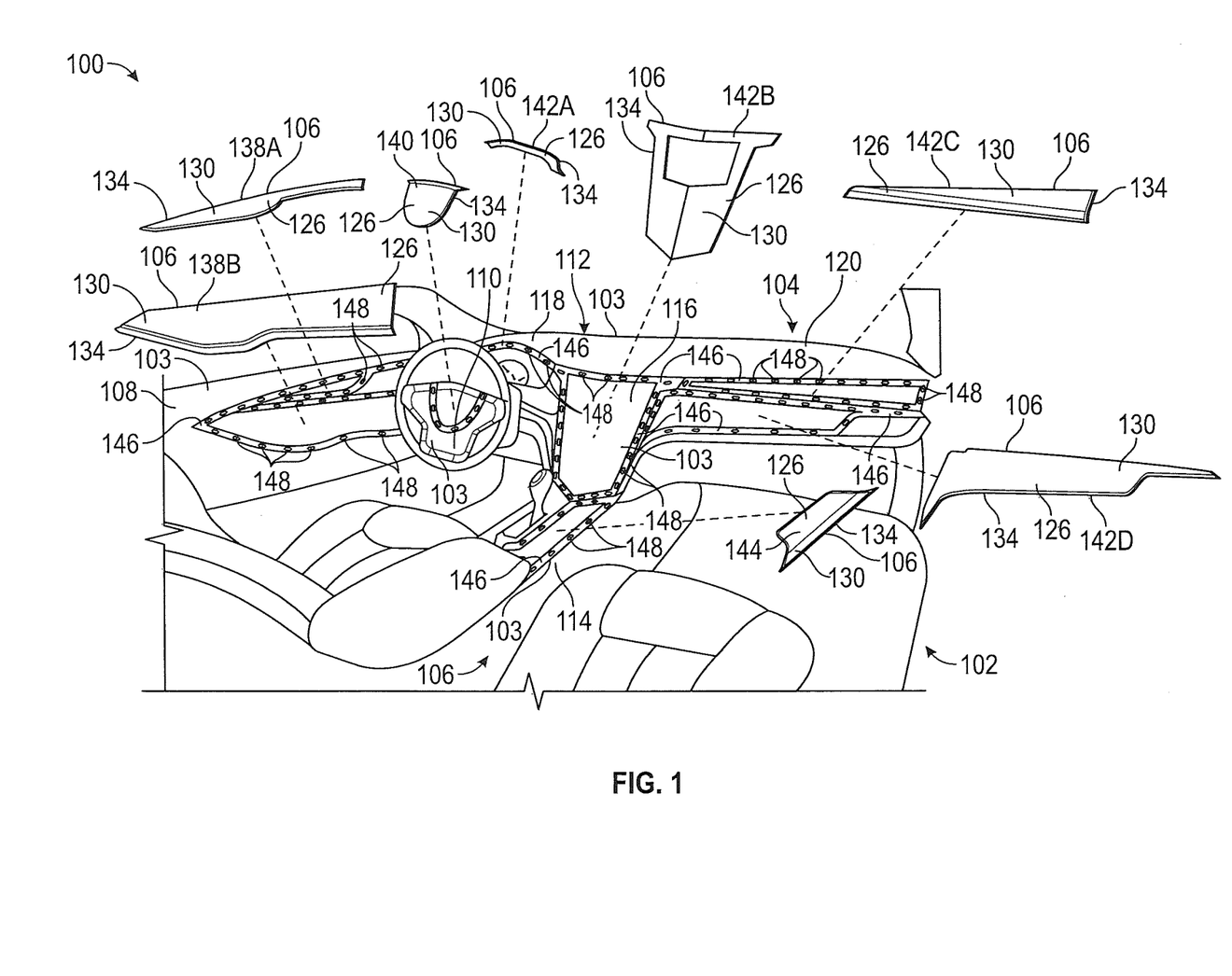
FIG. 1 is a schematic, perspective, partially disassembled view of a vehicle interior assembly, depicting a trim assembly including a plurality of trim members detached from a vehicle interior component carrier sub-assembly.

Referring now to the drawings, wherein the like numerals indicate corresponding parts throughout the several views, FIG. 1 schematically illustrates a vehicle 100 including a reconfigurable vehicle interior assembly 102. The vehicle interior assembly 102 includes a vehicle interior component carrier sub-assembly 104 and a plurality of instrument panel trim members or pieces 106 that can be coupled to different vehicle carrier components 103 of the vehicle interior carrier component sub-assembly 104. The trim members 106 may be part of a trim assembly 124 (FIG. 2) and may also be trim panels.

The vehicle interior carrier components 103 may be entirely or partially disposed inside the vehicle 100. In the depicted embodiment, the vehicle interior carrier component sub-assembly 102 includes a plurality of vehicle interior carrier components 103. In the present disclosure, some of the vehicle interior carrier components 103 at least partially define a passenger compartment 106 of the vehicle 100, while other vehicle interior carrier components 103 are devices that can be used to control the vehicle 100. As non-limiting examples, the vehicle interior carrier components 103 may include at least one door 108, a steering wheel 110, an instrument panel or dashboard 112, and a center floor console 114. The dashboard 112 may include a center console 116, a first lateral section 118, and a second lateral section 120. The first lateral section 118 is closer to the steering wheel 110 than the second lateral section 120 of the dashboard 112. All or some of the vehicle interior carrier components 103 may be decorated with one or more trim members 106 in order to enhance the aesthetic appeal of the vehicle 100.

In the present disclosure, the trim members 106 are removably coupled to the different vehicle interior carrier components 103. The trim members 106 may have different colors and/or styles. Accordingly, the vehicle 10 may be equipped with trim members 106 that are specifically tailored to satisfy a vehicle occupant's preferences. Because the trim members 106 can be decoupled from the vehicle interior carrier components 103, the vehicle interior assembly 102 may be reconfigured by replacing the trim members 106 with other trim members 106.

Figure 5:
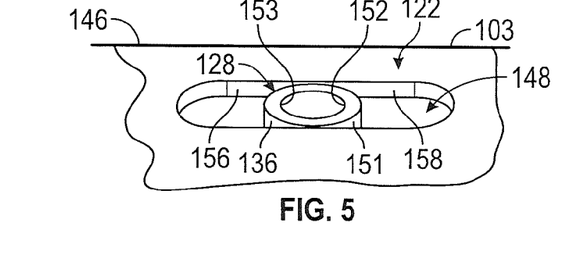
FIG. 5 is a schematic, perspective, enlarged view of the elastically deformable protrusion shown in FIG. 3 partially disposed in the aperture shown in FIG. 4.
Figure 7:
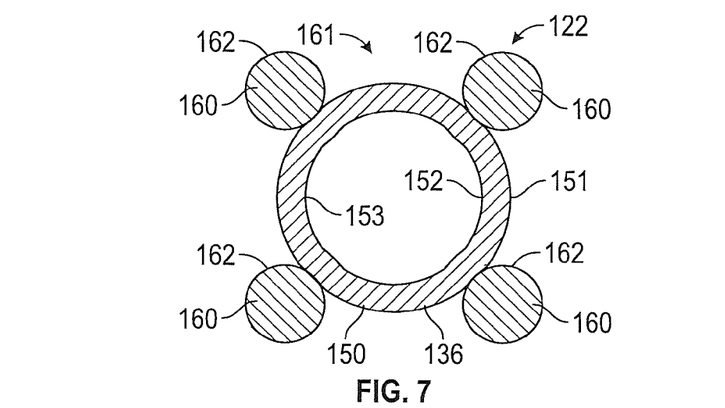
FIG. 7 is a schematic, sectional, enlarged view of the elastically deformable protrusion shown in FIG. 3 engaging the elastically deformable extensions shown in FIG. 6.

In order to facilitate coupling the trim members 106 to the vehicle interior carrier components 103, the vehicle interior assembly 102 includes elastic averaging couplings or interfaces 122 (see FIGS. 5 and 7). Elastically averaged coupling is based on the principle that alignment can be obtained by using a large number of fairly compliant contacting members. Therefore, the term "elastic averaging coupling" means a passive alignment coupling, in which two parts are joined using a large number of interference-fitting contact features.

When the two parts are joined, small errors in size and position of the interference-fitting contact features result in multiple elastic deformations that average to yield a precisely repeatable alignment. Unlike kinematic couplings, elastic averaging couplings are over-constraining systems in which each constraint is fairly elastic.

Figure 2:
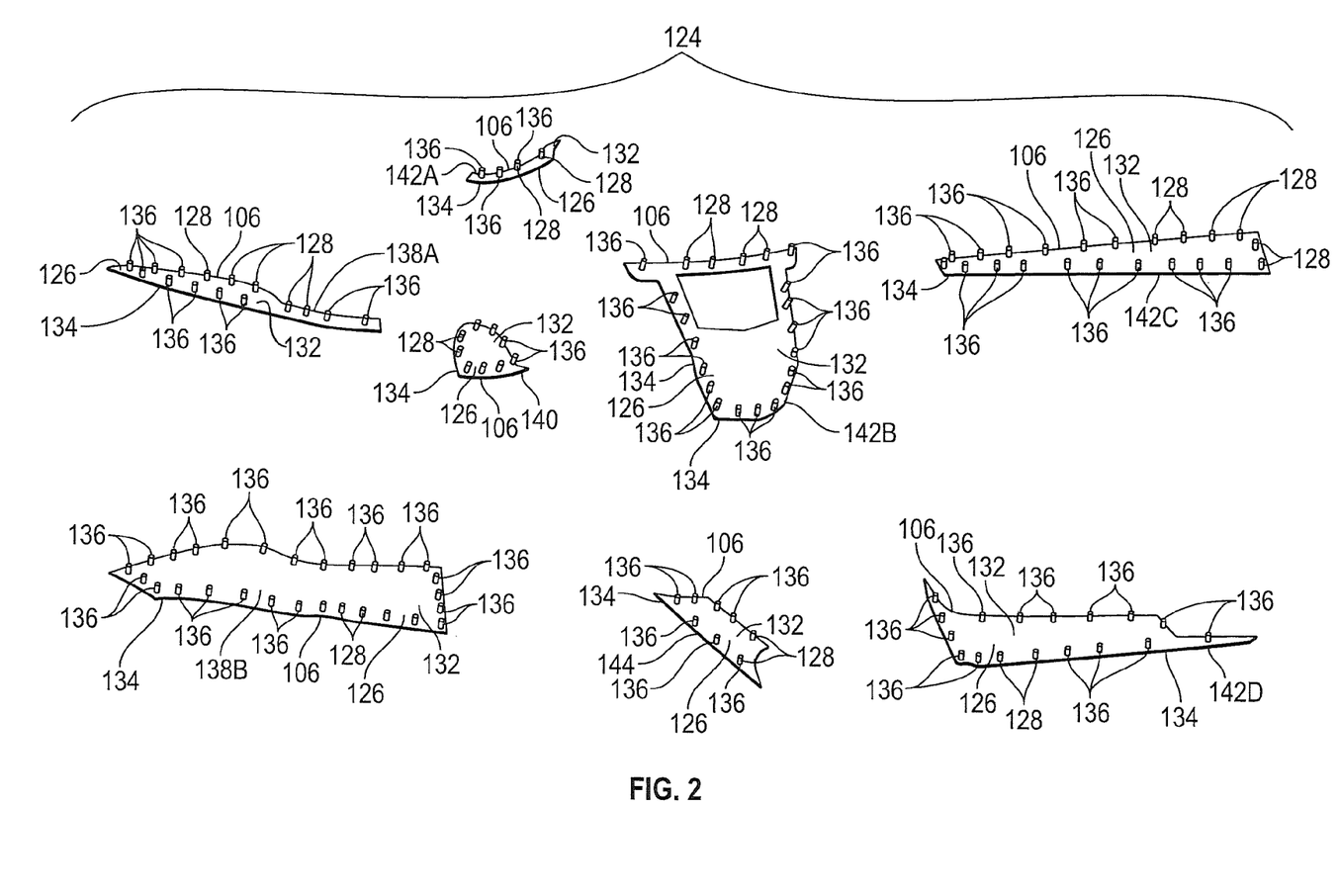
FIG. 2 is a schematic, perspective, bottom view of the trim assembly shown in FIG. 1, wherein each trim member includes a plurality of elastically deformable protrusions.

With reference to FIGS. 1 and 2, the trim assembly 124 (FIG. 2) includes a plurality of the trim members 106 and can be custom-made. For example, the trim members 106 may have different colors and styles in order to enhance the aesthetic appeal of the vehicle 100. Each trim member 106 includes a trim member body 126 defining a first or outer surface 130 (FIG. 1) and a second or inner surface 132 (FIG. 2). The second surface 132 is opposite to the first surface 130 and may intersect the first surface 130 along an edge 134. The first surface 130 of the trim member 106 faces away from a corresponding vehicle interior carrier component 103, whereas the second surface 132 faces toward a corresponding vehicle interior carrier component 103. Moreover, the first surface 130 may be a reflective surface.

In addition to the trim member body 126, each trim member 106 includes at least one first elastically deformable mating member 128 (FIG. 2). In the depicted embodiment, each trim member 106 includes a plurality of first elastically deformable mating members 128. At least one of the first elastically deformable mating members 128 may be an elastically deformable protrusion 136. The elastically deformable protrusion 136 may also be referred to as an elastically deformable locating protrusion. In the depicted embodiment, all the first elastically deformable mating members 128 are elastically deformable protrusions 136 extending from the trim member body 126. The elastically deformable protrusions 136 may specifically extend from the second surface 132 in a direction away from the first surface 130. It is contemplated, however, that the first elastically deformable mating members 128 may alternatively be configured, for example, as cavities that extend into the trim member body 126 or any other suitable elastically deformable structure. Regardless of its configuration, the first elastically deformable mating members 128 may be arranged along the edges 134 of the trim member bodies 126. For example, the trim members 106 may include first elastically deformable mating members 128 (e.g., elastically deformable protrusions 136) along the entire edge 134 of the trim member body 126.

As discussed above, the trim assembly 124 includes a plurality of trim members 106. Each trim member 106 can be removably coupled to a specific vehicle interior carrier component 103. As non-limiting examples, the trim assembly 124 may include one or more door trim members 138A, 138B, a steering wheel trim member 140, a center floor console trim member 144, and one or more dashboard trim members 142A, 142B, 142C, 142D. The door trim members 138A, 138B can be removably coupled to the door 108. The steering wheel trim member 140 can be removably coupled to the steering wheel 110. The center floor console trim member 144 can be removably coupled to the center floor console 116, and the dashboard trim members 142A, 142B, 142C, 142D can be removably coupled to different parts of the dashboard 112. The dashboard trim member 142B may be referred to as a center console trim member.

With continued reference to FIGS. 1 and 2, each vehicle interior carrier component 103 includes at least one second elastically deformable mating member 148 configured to mate with a corresponding first elastically deformable mating member 128. In the depicted embodiment, each vehicle interior carrier component 103 includes a plurality of second elastically deformable mating members 148. Each second deformable mating member 148 can mate a corresponding first deformable mating member 128 in a deformation-fit manner to couple a trim member 106 to a corresponding vehicle interior carrier component 103. In other words, each of the first elastically deformable mating members 128 can mate with at least one of the second elastically deformable mating members 148 in a deformation-fit engagement in order to couple the trim member 106 to the corresponding vehicle interior carrier component 103. The first and second elastically deformable mating members 128, 148 collectively form a plurality of elastic averaging couplings 122 (FIGS. 5 and 7). As such, the first elastically deformable mating members 128 or second elastically deformable mating member 148 (or both) elastically deform when they are coupled to each other.

Each vehicle interior carrier component 103 may include a coupling structure 146, such as a border, rim, or raised surface, and the second elastically deformable mating members 148 are disposed along the coupling structure 146. In the depicted embodiment, some of the coupling structures 146 are borders, and the second elastically deformable mating members 148 span the border of those vehicle interior carrier components 103.

Figure 3:
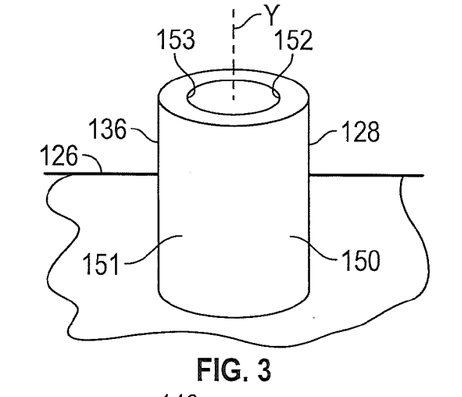
FIG. 3 is a schematic, perspective, enlarged view of one elastically deformable protrusion of the trim members shown in FIG. 2.
Figure 4:
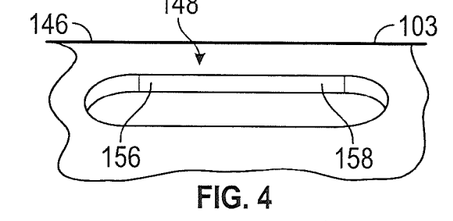
FIG. 4 is a schematic, perspective, enlarged view of one aperture of the vehicle interior component carrier sub-assembly shown in FIG. 1 in accordance with an embodiment of the present disclosure.

With reference to FIGS. 3-5, at least one of the first elastically deformable mating members 128 may be an elastically deformable protrusion 136 as discussed above. Each elastically deformable protrusion 136 extends from the trim member body 126 along a longitudinal axis Y. As a non-limiting example, the elastically deformable protrusion 136 may be a cylinder or a tube and, as such, includes a cylindrical body 150 defining an opening 152 extending into the cylindrical body 150 along the longitudinal axis Y. The cylindrical body 150 may define an outer body surface 151 and an inner body surface 153. The inner body surface 153 defines the opening 152. Thus, the elastically deformable protrusion 136 may be hollow to facilitate deformation of its cylindrical body 150. Thus, the elastically deformable protrusion 136 may also be referred to as a compressible tube or cylinder. However, it is contemplated that the elastically deformable protrusion 136 may be solid and, therefore, would not include opening 152. Even if the elastically deformable protrusion 136 is solid, it can be deformed when mated with a corresponding second elastically deformable mating member 148.

With reference to FIG. 4, at least one of the second elastically deformable mating members 148 may be an aperture 156 extending into the vehicle interior carrier component 103. In the depicted embodiment, the aperture 156 is a slot and extends into the coupling structure 146 of the vehicle interior carrier component 103. The coupling structure 146 (or another part of the vehicle interior carrier component 103) includes an inner mating surface 158 defining the aperture 156. Irrespective of its location in the vehicle interior carrier component 103, the aperture 156 is configured, shaped, and sized to receive at least one elastically deformable protrusion 136 (or any other type of first elastically deformable mating member 128) in deformable engagement so as to form an elastic averaging coupling 122 (FIG. 5), thereby coupling the vehicle interior carrier component 103 to the trim member 106.

With reference to FIG. 5, the elastically deformable protrusion 136 can be at least partially inserted in the aperture 156 in the coupling structure 146 in order to couple trim member 106 (FIG. 1) to the vehicle interior carrier component 103 in an elastically deformable manner. When the elastically deformable protrusion 136 is at least partially inserted in the aperture 156, the outer body surface 151 is in contact with the inner mating surface 158. Further, when the elastically deformable protrusion 136 is at least partially inserted in the aperture 156, the elastically deformable protrusion 136 is compressed due to a force exerted by the inner mating surface 158 on the outer body surface 151. Alternatively or additionally, when the elastically deformable protrusion 136 is at least partially inserted in the aperture 156, the aperture 156 may expand due to a force exerted by the elastically deformable protrusion 136 on the inner mating surface 156. Moreover, the vehicle interior carrier component 103 and the trim member 106 are coupled by a deformable engagement defined by the elastically deformable protrusion 136 and the inner mating surface 158 defining the aperture 156.

Figure 6:
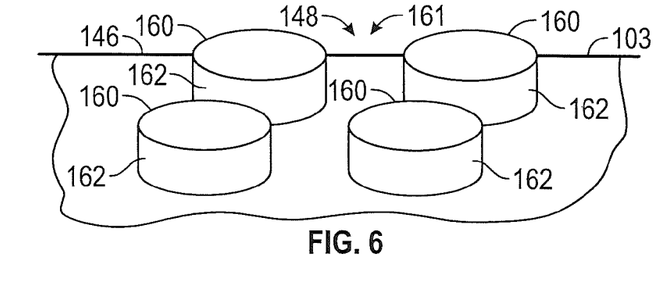
FIG. 6 is a schematic, perspective, enlarged view of elastically deformable extensions of the vehicle interior component carrier sub-assembly shown in FIG. 1 in accordance with another embodiment of the present disclosure.

Referring to FIG. 6, in an embodiment, at least one of the second elastically deformable mating members 148 may include a plurality of elastically deformable extensions 160 spaced apart from one another so as to define a gap 161. In the depicted embodiment, each second elastically deformable mating member 148 includes four elastically deformable extensions 160; however, each second elastically deformable mating member 148 may include any number of elastically deformable extensions 160. The elastically deformable extensions 160 may be substantially cylindrical and each extends from the coupling structure 146 of the vehicle interior carrier component 103. Each elastically deformable extension 160 defines an outer extension surface 162. The outer extension surfaces 162 of the elastically deformable extensions 160 of each elastically deformable mating member 148 define the gap 161. The gap 161 is configured, shaped, and sized to receive at least one of the elastically deformable protrusions 136 such that the at least one of the elastically deformable protrusions 136 engages the elastically deformable extensions 160 in the elastically deformable engagement, thereby coupling the vehicle interior carrier component 103 to the trim member 106. Specifically, in the depicted embodiment, one elastically deformable protrusion 136 is at least partially inserted in the gap 161 such that the outer body surface 151 contacts the outer extension surfaces 162 of the elastically deformable extensions 160. When the elastically deformable protrusion 136 is at least partially inserted in the gap 161, the elastically deformable extensions 160 may exert a force on the outer body surface 151 and thereby compress the elastically deformable protrusion 136. Alternatively or additionally, when the elastically deformable protrusion 136 is at least partially inserted in the gap 161, the outer body surface 151 may exert a force on the outer extension surfaces 162 and thereby expand the gap 161.

The present disclosure also relates to a method of assembling a vehicle interior assembly 102. In an embodiment, the method includes providing a trim member 106 including a plurality of first elastically deformable mating members 128 as shown in FIGS. 1 and 2; providing a vehicle interior carrier component 103 including a plurality of second elastically deformable mating members 148 as shown in FIGS. 1 and 2. As discussed above, each of the first elastically deformable mating members 128 is configured to mate with at least one of the second elastically deformable mating members 148 in an elastically deformable engagement. The method further includes mating the first elastically deformable mating members 128 with the second deformable mating members 148 in order to couple the trim member 106 to the vehicle interior coupling member 103 as shown in FIGS. 5 and 7.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A reconfigurable vehicle interior assembly, comprising:
   a trim member including a trim member body and a plurality of elastically deformable protrusions having a cylindrical body extending from the trim member body defining a plurality of first elastically deformable mating members; and
   a vehicle interior carrier component including an aperture defining at least one of a plurality of second elastically deformable mating members configured to receive and engage at least one of the elastically deformable protrusions in order to couple the trim member to the vehicle interior carrier component, and
   wherein the plurality of first and the plurality of second elastically deformable mating members collectively form a plurality of elastic averaging couplings that operate to establish a precise alignment between the trim member and the vehicle carrier component.

2. The reconfigurable vehicle interior assembly of claim 1, wherein the trim member body includes a first surface and a second surface opposite the first surface, the first surface faces away from the vehicle interior carrier component, the second surface faces toward the vehicle interior carrier component, and the elastically deformable protrusions extend from the second surface.

3. The reconfigurable vehicle interior assembly of claim 1, wherein the cylindrical body is deformable.

4. The reconfigurable vehicle interior assembly of claim 3, wherein the at least one of the elastically deformable protrusions defines an opening that extends into the cylindrical body along a longitudinal axis.

5. The reconfigurable vehicle interior assembly of claim 1, wherein the aperture is a slot.

6. The reconfigurable vehicle interior assembly of claim 1, wherein at least one of the plurality of second elastically deformable mating members comprises a plurality of elastically deformable extensions spaced apart from one another so as to define a gap, and the gap receives at least one of the elastically deformable protrusions such that the at least one of the elastically deformable protrusions engages the elastically deformable extensions.

7. The reconfigurable vehicle interior assembly of claim 6, wherein each of the elastically deformable extensions defines an outer extension surface, and the at least one of the elastically deformable protrusions contacts the outer extension surface of the elastically deformable extensions when the at least one of the elastically deformable protrusions is at least partially disposed in the gap.

8. The reconfigurable vehicle interior assembly of claim 7, wherein each of the elastically deformable extensions has a cylindrical shape.

9. The reconfigurable vehicle interior assembly of claim 1, wherein the trim member is a center floor console trim member.

10. The reconfigurable vehicle interior assembly of claim 1, wherein the trim member is a dashboard trim member.

11. The reconfigurable vehicle interior assembly of claim 10, wherein the dashboard trim member is a center console trim member.

12. The reconfigurable vehicle interior assembly of claim 1, wherein the trim member is a door trim member.

13. The reconfigurable vehicle interior assembly of claim 1, wherein the trim member is a steering wheel trim member.

14. A vehicle, comprising:
a trim assembly including a plurality of trim members, each of the plurality of trim members including a trim member body and a plurality of elastically deformable protrusions having a cylindrical body extending from the trim member body defining a plurality of first elastically deformable mating members; and
a vehicle interior carrier component sub-assembly including a plurality of a vehicle interior carrier components, each of the vehicle interior carrier components including an aperture defining at least one of a plurality of second elastically deformable mating members configured to receive and engage at least one of the elastically deformable protrusions in order to couple at least one of the plurality of trim members to the vehicle interior carrier components, and
wherein the plurality of first elastically deformable mating members and the plurality of second elastically deformable mating members collectively form a plurality of elastic averaging couplings that operate to establish a precise alignment between at least one of the plurality of trim members and at least one of the vehicle interior carrier components.

15. A method of assembling a vehicle interior assembly, the method comprising:
providing a trim member including a trim member body and a plurality of elastically deformable protrusions having a cylindrical body extending from the trim member body defining a plurality of first elastically deformable mating members;
providing a vehicle interior carrier component including an aperture defining at least one of a plurality of second elastically deformable mating members configured to receive and engage at least one of the elastically deformable protrusions;
mating the plurality of first elastically deformable mating members with one or more of the plurality of second elastically deformable mating members in order to couple the trim member to the vehicle interior carrier component; and
establishing a precise alignment of the trim member and the vehicle interior carrier component by elastically averaging the plurality of first of elastically deformable mating members and the one or more of the plurality of second elastically deformable mating members.

* * * * *